United States Patent
Chen et al.

(10) Patent No.: US 10,809,446 B2
(45) Date of Patent: Oct. 20, 2020

(54) OFFSETTING NON-UNIFORM BRIGHTNESS IN A BACKLIT DISPLAY ASSEMBLY VIA A SPATIAL DISTRIBUTION OF LIGHT EXTRACTION FEATURES

(71) Applicant: Facebook Technologies, LLC, Menlo Park, CA (US)

(72) Inventors: Dong Chen, Suzhou (CN); Shizhe Shen, San Mateo, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 126 days.

(21) Appl. No.: 16/231,116

(22) Filed: Dec. 21, 2018

(65) Prior Publication Data
US 2020/0200962 A1 Jun. 25, 2020

(51) Int. Cl.
*F21V 8/00* (2006.01)
(52) U.S. Cl.
CPC .......... *G02B 6/0058* (2013.01); *G02B 6/0036* (2013.01)
(58) Field of Classification Search
CPC .............. G02B 6/0036; G02B 6/0058; G02B 2027/0178; G02B 27/017; G02B 27/0093; G09G 2340/10
See application file for complete search history.

(56) References Cited

U.S. PATENT DOCUMENTS

| 2017/0269359 A1* | 9/2017 | Kilcher | G02B 27/0101 |
| 2018/0045967 A1* | 2/2018 | Osterhout | G06F 3/03545 |

OTHER PUBLICATIONS

U.S. Appl. No. 15/335,807, dated May 3, 2018, Gollier et al.
U.S. Appl. No. 15/179,883, dated Dec. 14, 2017, Gollier et al.
U.S. Appl. No. 15/441,738, dated Sep. 7, 2017, Geng et al.

* cited by examiner

*Primary Examiner* — Abbas I Abdulselam
(74) *Attorney, Agent, or Firm* — Fenwick & West LLP (57) ABSTRACT

A headset includes a display block and an optics block. The display block includes a waveguide configured to receive light from a light source assembly, a plurality of extraction features that have a spatial distribution across one or more surfaces of the waveguide, wherein the plurality of extraction features out-couple light from the waveguide, and the spatial distribution is such that out-coupled light has a first non-uniform brightness distribution, and a display panel configured to modulate the out-coupled light to form image light, wherein the image light has a brightness distribution based in part on the first non-uniform brightness distribution. The optics block includes optical elements configured to direct the image light to an eyebox, and the optics block adds a second non-uniform brightness distribution that is offset by the first non-uniform brightness distribution, such that the image light directed to the eyebox has a target brightness distribution.

20 Claims, 7 Drawing Sheets

OFFSETTING NON-UNIFORM BRIGHTNESS IN A BACKLIT DISPLAY ASSEMBLY VIA A SPATIAL DISTRIBUTION OF LIGHT EXTRACTION FEATURES

BACKGROUND

This disclosure relates generally to backlit displays, and specifically to using offsetting non-uniform brightness in a backlit display assembly via a spatial distribution of light extraction features.

Some conventional head-mounted displays (HMDs) include components in the optical path of a display of the HMD that can result in non-uniform brightness of a displayed image. For example, in a backlit display, a display panel may cause a non-uniform brightness in the image light. The non-uniform brightness degrades image quality and can adversely affect a user's use of the HMD.

SUMMARY

A spatial distribution of light extraction features is used to offset non-uniform brightness. The display block includes a waveguide, a plurality of extraction features, and a display panel. The waveguide is configured to receive light from a light source assembly. The plurality of extraction features have a spatial distribution across one or more surfaces (e.g., front surface and/or back surface) of the waveguide. The plurality of extraction features out-couple light from the waveguide (e.g., in a direction of an eyebox), and the spatial distribution is such that out-coupled light has a first non-uniform brightness distribution. The display panel is configured to modulate the out-coupled light to form image light. The image light has a brightness distribution based in part on the first non-uniform brightness distribution.

The image light may then be passed through an optics block. The optics block includes a first optical element and a second optical element that together generate a folded optical system that is configured to direct the image light to an eyebox. The folded optical system adds a second non-uniform brightness distribution that is offset by the first non-uniform brightness distribution, such that the image light directed to the eyebox has a target brightness distribution. In some embodiments, the display block and the optics block may be part of a headset.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A headset for displaying images includes a display block with a light source assembly that provides light to a waveguide with extraction features distributed across one or more surfaces of the waveguide. The extraction features out-couple light from the waveguide in a direction towards a display panel, with the out-coupled light having a first non-uniform brightness distribution dependent on a spatial distribution of the extraction features. The display panel modulates the out-coupled light to form image light which has a brightness distribution. An optics block, including one or more elements, directs the image light to the eyebox.

At least one component of the headset introduces a non-uniform brightness distribution that is offset by the first non-uniform brightness distribution generated by the spatial distribution of the extraction features. For example, the display panel and/or the optics block may introduce a non-uniform brightness distribution that is offset by the first non-uniform brightness distribution to provide a target brightness distribution of image light at the eyebox. In some embodiments, the optics block includes optical elements that form a folded optical system, such as a pancake lens assembly. The spatial distribution of the extraction features on the waveguide offsets errors in the brightness distribution of the image light at the eyebox introduced by the folded optical system. The spatial distribution of the extraction features may be non-uniform. For example, a density of a number of extraction features per unit area may be relatively low near an optical axis of the display block and relatively high at distances farther from the optical axis. In this manner, the spatial distribution of extraction features can be tailored to offset any undesirable non-uniformity in the brightness distribution of a displayed image caused by one or more components of the headset.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset or head-mounted display (HMD) connected to a host computer system, a standalone NED, a mobile device or computing system, any other hardware platform capable of providing artificial reality content to one or more viewer, or some combination thereof.

Headset

Figure 1:
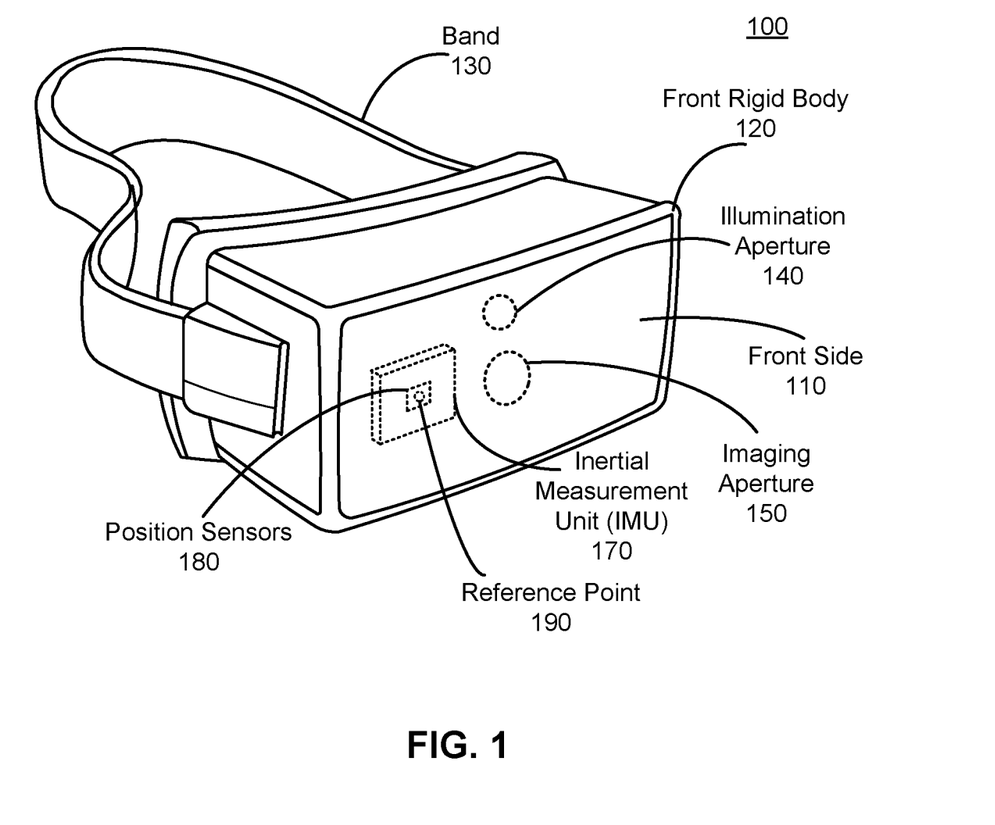
FIG. 1 is a diagram of a headset, in accordance with one or more embodiments.

FIG. 1 is a diagram of a headset 100, in accordance with one or more embodiments. In the illustrated embodiments, the headset 100 is a HMD. The headset 100 may be part of an artificial reality system. In embodiments that describe AR system and/or a MR system, portions of a front side 110 of the headset 100 are at least partially transparent in the visible band (~380 nm to 750 nm), and portions of the headset 100 that are between the front side 110 of the headset 100 and an eye of the user are at least partially transparent (e.g., a partially transparent electronic display).

The headset 100 provides content (e.g., virtual, augmented, etc.) to a wearer. The headset 100 includes a front rigid body 120 and a band 130. The front rigid body 120 includes a depth camera assembly (not shown), an illumination aperture 140, an imaging aperture 150, a backlit display assembly (not shown), an Inertial Measurement Unit (IMU) 170, one or more position sensors 180, and the reference point 190.

The depth camera assembly (DCA) is configured to determine depth information of a local area surrounding some or all of the headset 100. An illumination source of the DCA emits infrared light (e.g., structured light, flash illumination for time-of-flight, etc.) through the illumination aperture 140. An imaging device of the DCA captures light from the illumination source that is reflected from the local area through the imaging aperture 150. The DCA determines depth information from the local area using the captured images.

The backlit display assembly is configured to present content. As described below with regard to FIGS. 2-6, the backlit display assembly includes an optics block and a display block. The display block generates image light that includes a non-uniform brightness distribution that is used to offset errors in brightness caused by, e.g., components of the optics block and/or a display panel of the display block. The non-uniform brightness distribution of the image light may be an error brightness distribution which results in unintended errors in the image viewed by the user. The optics block directs the image light to an eyebox for each eye of a wearer.

The IMU 170 is an electronic device that generates IMU data based on measurement signals received from one or more of the position sensors 180. The reference point is a point that may be used to describe the position of the headset 100. A position sensor 180 generates one or more measurement signals in response to motion of the headset 100. Examples of position sensors 180 include: one or more accelerometers, one or more gyroscopes, one or more magnetometers, another suitable type of sensor that detects motion, a type of sensor used for error correction of the IMU 170, or some combination thereof. In the embodiment shown by FIG. 1, the position sensors 180 are located within the IMU 170, and neither the IMU 170 nor the position sensors 180 are visible to a user of the headset 100. The position sensors 180 may be located external to the IMU 230, internal to the IMU 230, or some combination thereof.

Figure 2:
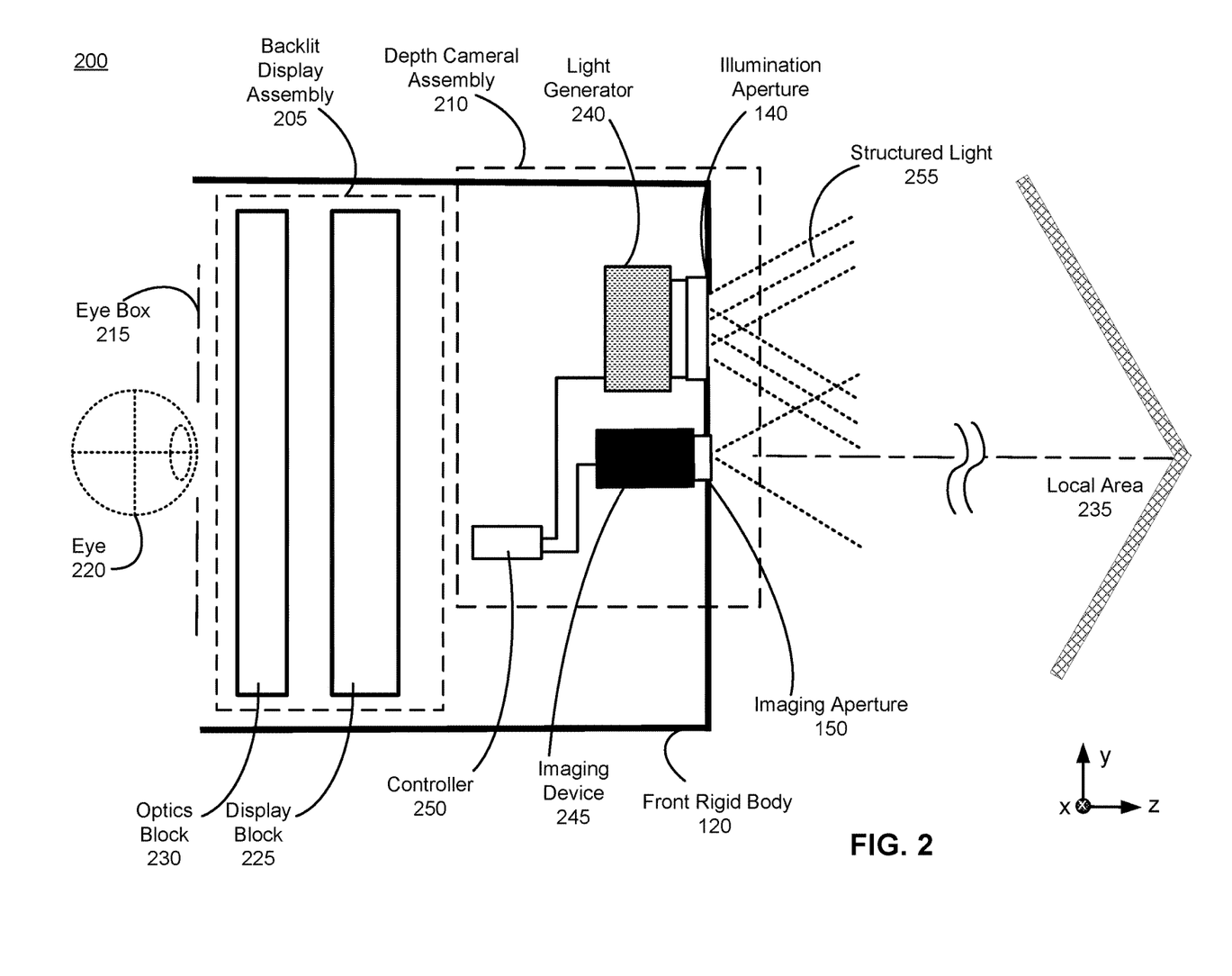
FIG. 2 is a cross-section of a front rigid body of the headset in FIG. 1, in accordance with one or more embodiments.

FIG. 2 is a cross-section 200 of the front rigid body 120 of the headset 100 in FIG. 1, in accordance with one or more embodiments. As shown in FIG. 2, the front rigid body 120 includes backlit display assembly 205 and a DCA 210.

The backlit display assembly 205 provides image light to an eye-box 215. The eye-box 215 is the location of the front rigid body 120 where a user's eye 220 is positioned. For purposes of illustration, FIG. 2 shows a cross section 200 associated with a single eye 220, but another backlit display assembly 205, separate from the backlit display assembly 205, may provide image light to another eye of the user. In some embodiments, a single backlit display assembly 205 may provide image light to both of a user's eyes. The backlit display assembly 205 includes a display block 225 and an optics block 230.

The display block 225 generates image light that includes a non-uniform brightness distribution. The non-uniform brightness distribution offsets errors in brightness caused by the display block 225, the optics block 230, some other component of the headset 100, or some combination thereof. The display block is discussed in detail below with regard to FIG. 3.

The optics block 230 directs light received from the display block to the eye box 215. The optics block 230 includes one or more optical elements that direct the image light to the eye box 215. An optical element may be an aperture, a Fresnel lens, a refractive lens, a reflective surface, a waveplate (e.g., quarter wave plate), a diffractive element, a waveguide, a reflector (full reflector or a partial reflector), a filter, any other suitable optical element that affects the image light emitted from the display block 225, or some combination thereof. Moreover, the optics block 230 may include combinations of different optical elements. In some embodiments, one or more of the optical elements in the optics block 230 may have one or more coatings, such as anti-reflective coatings, dichroic coatings, etc. In some embodiments, there are a plurality of optical elements, including at least a first optical element and a second optical element, that together form a folded optical system (i.e., the light is reflected back towards the display block 225 at least once before exiting the optics block 230). In some embodiments, a pancake lens assembly is an example, of a folded optical system. Additional details of a pancake lens assembly may be found at, e.g., U.S. patent application Ser. No. 15/441,738, U.S. patent application Ser. Nos. 15/335,807, and 15/179,883 which are hereby incorporated by reference in their entirety.

The optics block 230 may add a non-uniform brightness distribution that is offset by the non-uniform brightness distribution of the image light emitted by the display block 225, such that the image light directed to the eye box 215 has a target brightness distribution. The target brightness distribution is a brightness distribution of the image light where non-uniformities introduced by the optics block 230, the display block 225, some other component of the headset 100, or some combination thereof, have been reduced to less than some threshold value (e.g. less than 1%).

In some embodiments, the optics block 230 magnifies received light from the display block 225 and corrects optical aberrations associated with the image light, and the corrected image light is presented to a user of the headset 100. Magnification of the image light by the optics block 230 allows elements of the display block 225 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view.

As shown in FIG. 2, the front rigid body 120 further includes the DCA 210 for determining depth information of one or more objects in a local area 235 surrounding some or all of the headset 100. The DCA 210 includes a light generator 240, an imaging device 245, and a controller 250 that may be coupled to both the light generator 240 and the imaging device 245. The light generator 240 emits light through the illumination aperture 140. In accordance with embodiments of the present disclosure, the light generator 240 is configured to illuminate the local area 235 with structured light 255 in accordance with emission instructions generated by the controller 250. The controller 250 is configured to control operation of certain components of the light generator 240, based on the emission instructions. The controller 285 provides the emission instructions to a plurality of diffractive optical elements of the light generator 240 to control a field-of-view of the local area 235 illuminated by the structured light 255.

The light generator 240 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), some other source, or some combination thereof. In some embodiments, a single emitter or a plurality of emitters in the light generator 240 can emit light having a structured light pattern.

The imaging device 245 includes one or more cameras configured to capture, through the imaging aperture 150, portions of the structured light 255 reflected from the local area 235. The imaging device 245 captures one or more images of one or more objects in the local area 235 illuminated with the structured light 255. The controller 250 is also configured to determine depth information for the one or more objects based on the captured portions of the reflected structured light. In some embodiments, the controller 250 provides the determined depth information to a console (not shown in FIG. 2). The console and/or the headset 100 may utilize the depth information to, e.g., generate content for presentation by the backlit display assembly 205.

Figure 3:
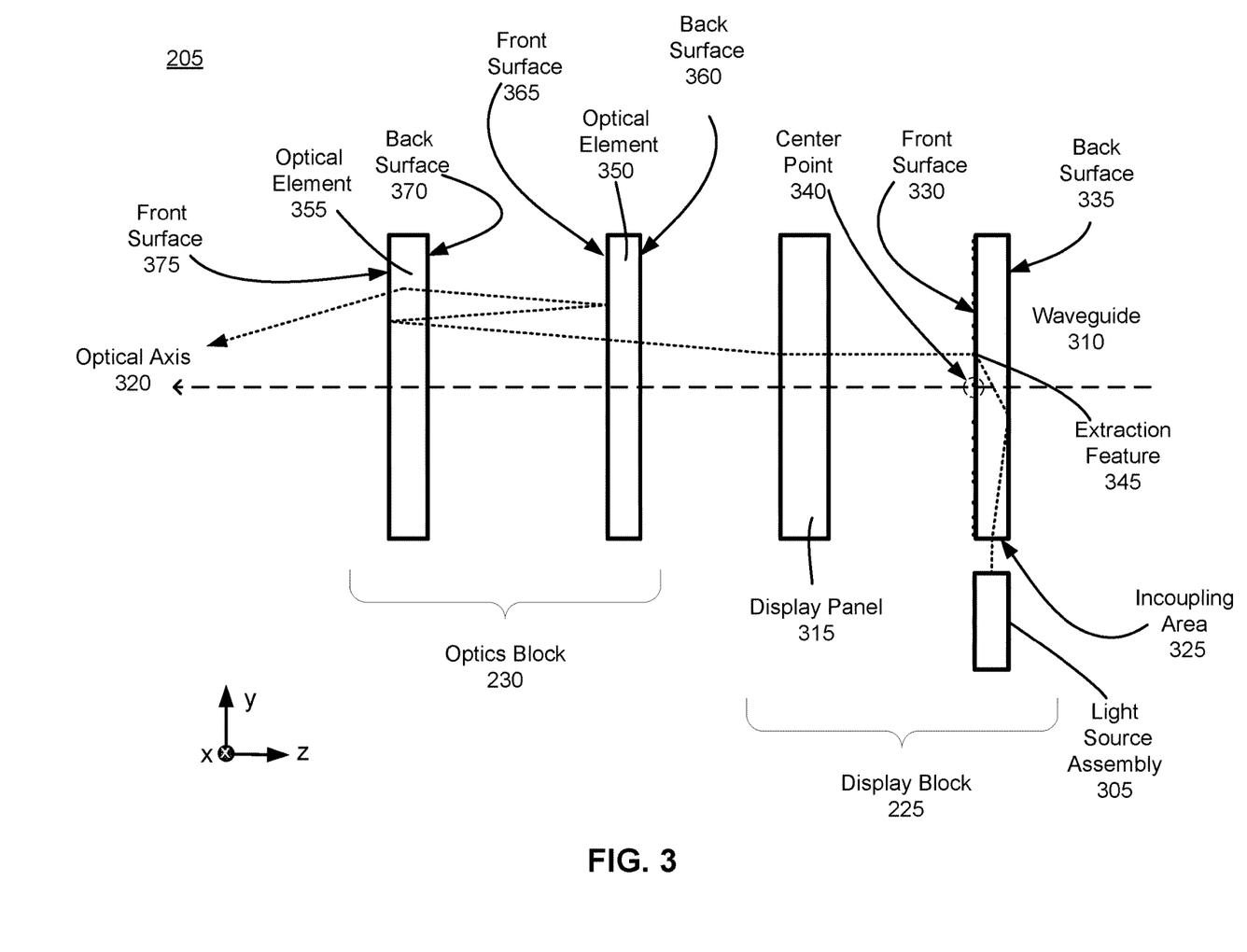
FIG. 3 is a diagram showing a backlit display assembly, in accordance with one or more embodiments.

FIG. 3 is a diagram showing the backlit display assembly 205, in accordance with one or more embodiments. The backlit display assembly 205 includes embodiments of the display block 225 and the optics block 230. In other embodiments, the backlit display assembly 205 may include additional components than those illustrated.

The display block 225 generates image light having a first non-uniform brightness distribution. The display block 225 includes a light source assembly 305, a waveguide 310, and a display panel 315. In some embodiments, the display block 225 may include additional components. For example, the display block 225 may include a diffuser between the waveguide 310 and the display panel 315.

The light source assembly 305 generates light in a first optical band. The light source assembly 305 includes one or more source elements that generate light in the first optical band. The first optical band includes at least light in the visible band. A source element may be, for example, a light emitting diode (LED), an organic LED (OLED), a laser diode, a vertical-cavity surface-emitting lasers (VCSEL), a micro-LED, some other device that emits light in the first optical band, or some combination thereof. The light source assembly 305 may include a plurality of source elements that emit light in one or more color channels of the visible band (e.g., red, green, blue, white, etc.). In some embodiments, the light from the light source assembly 305 is coupled into the waveguide 310 in a direction different from an optical axis 320 of the backlit display assembly 205. In other embodiments the light source assembly 310 may be positioned different from what is shown in FIG. 3

The waveguide 310 directs the light from the light source assembly 305 towards the display panel 315. The waveguide 310 includes an incoupling area 325 a front surface 330, and a back surface 335 that is opposite to the front surface 330. The optical axis 320 intersects the front surface 330 at a center point 340. Light is incoupled into the waveguide 310 at the incoupling area 325. In some embodiments, the waveguide 310 is formed from an optically transparent material. For example, the waveguide 310 may be formed of glass, plastic, semiconductor material, any other material that is substantially transparent to light in the first optical band, or some combination thereof. In some embodiments, the waveguide 310 has a curvature and is not flat. In some embodiments, the incoupled light propagates through the waveguide 310 via total internal reflection (TIR). In some embodiments, one or both of the front surface 330 and the back surface 335 may be coated with at least a partially reflecting surface. For example, the back surface may be coated with a 100% reflective surface (for light in the visible band) and the front surface 330 may be coated with an 80% reflective surface (for light in the visible band).

One or both of the front surface 330 and/or the back surface 335 may include extraction features that cause light to outcouple from the waveguide 310 (e.g., towards the display panel 315). For example, in the illustrated embodiment, the front surface 330 includes a plurality of extraction features that includes the extraction feature 345.

The extraction features are arranged along one or both of the front surface 330 and/or the back surface 335 in a spatial distribution which introduces the first non-uniform brightness distribution in the out-coupled light. The first non-uniform brightness distribution offsets errors in brightness distribution caused by other components of the headset (e.g., the display panel 315 and/or the optics block 230). A higher spatial density of extraction features in a region of the waveguide 310 (relative to other regions of the waveguide 310 with a lower spatial density of extraction features) results in an increase in out-coupled light at the region (relative to the other regions). The spatial distribution of extraction features is determined based on errors in the brightness distribution that are introduced by other components of a headset. For example, if the other components are known to cause dimness in a peripheral region of the displayed image (relative to other portions of the displayed image), the spatial distribution of extraction features is designed such that a density of extraction features along the periphery of the waveguide 310 that generally corresponds to the peripheral region of the displayed image is higher than other areas (e.g., a central region) of the waveguide 310. Such a spatial distribution of extraction features thereby can create a non-uniform brightness distribution that offsets the dimness along the peripheral region of the displayed image, resulting in the displayed image having a target brightness distribution. Accordingly, by adjusting the spatial distribution of extraction features such that it is higher in some areas and lower in other areas, a non-uniform brightness profile is created in the out-coupled light that mitigates errors in brightness distribution caused by other components of the headset.

The display panel 315 modulates the out-coupled light from the waveguide 310 to form image light corresponding to image content to be displayed to the user. The display panel 315 spatially modulates the out-coupled light in the first optical band received from the waveguide 310. In some embodiments, the display panel 315 includes a color filter array overlaying a liquid crystal array. The color filter array may be, e.g., a Bayer pattern, another color pattern, or some combination thereof. Out-coupled light in the first optical band from the waveguide 310 is modulated by the color filter array and the liquid crystal array to form the image light. In some embodiments, the display panel may include additional optical elements. In some embodiments, the display panel 315 has a curvature and is not flat. For example, the display panel 315 may have a curvature that matches a curvature of the waveguide 310. The display panel 315 transmits the image light towards the optics block 230.

The display panel 315 may introduce a non-uniform brightness distribution to the image light displayed to the user that is offset by the first non-uniform brightness distribution of the spatial distribution of extraction features. For example, the image light transmitted from the periphery of the display panel may be less bright than at the center of the display panel 315. In some cases, the brightness of the transmitted image light may decrease as a function of distance from the optical axis 320 or the center point 340. The non-uniform brightness introduced by the display panel 315 is not limited to exemplary spatial relationships discussed above, and some embodiments may include other non-uniform brightness distributions with different spatial relationships.

The optics block 230 directs light transmitted from the display panel 315 to the eye box 215 along the optical axis 320. In the illustrated embodiment, the optics block 230 includes a first optical element 350 and a second optical element 355, that together form a folded optical system. In the illustrated embodiments, the folded optical system is a pancake lens assembly. Note that one or both of the optical element 350 and the optical element 355 may impart optical power to the light (e.g., have curved front and/or back surfaces). For example, in one embodiment of a pancake lens assembly, the optical element 350 includes a back surface 360 coated with a partial reflector (e.g., 50:50 reflector), and a front surface 365 coated with a quarter waveplate. And the optical element 355 includes a back surface 370 coated with a quarter waveplate and a front surface 375 coated with a reflective linear polarizer. In some embodiments, the back surface 360 may also have a linear polarizer coated on top of the partial reflector.

In some embodiments, the optics block 230 includes more than two optical elements forming a folded optical system. For example, the optics block 230 may include four optical elements forming a folded optical system. Additional details of a pancake lens assembly may be found at, e.g., U.S. patent application Ser. No. 15/441,738, U.S. patent application Ser. Nos. 15/335,807, and 15/179,883 which are hereby incorporated by reference in their entirety. Embodiments of the optics block 230 are not limited to the examples discussed herein.

The optics block 230 may add a non-uniform brightness that is offset by the non-uniform brightness distribution of the image light emitted by the display block 225. The non-uniform brightness distribution added by the optics block 230 is also referred to herein as an error distribution. For example, the error distribution may have a lower brightness of image light at a peripheral region that circumscribes a center region than in the center region. In some cases, the error distribution may have a brightness of the image light decreasing as a function of distance from the optical axis 320 or the center point 340. The error distribution introduced by the optics block 230 is not limited to exemplary spatial relationships discussed above, and some embodiments may include other non-uniform brightness distributions with different spatial relationships.

The image light that is delivered to the eyebox 215 has a target brightness distribution as a result of the error distribution of the optics block 230 being offset by the non-uniform brightness distribution of the display panel 315, which is in turn offset by the first non-uniform brightness distribution of the spatial distribution of extraction features. The spatial distribution of extraction features provides the benefit of offsetting any unintended errors in the brightness distribution that may otherwise exist in the image light delivered to the eyebox 215, resulting in the target distribution. Different configurations of the spatial distribution may be used to achieve various target brightness distributions. The target brightness distribution is a brightness distribution of the image light where non-uniformities introduced by the optics block 230, the display block 225, some other component of the headset 100, or some combination thereof, have been reduced to less than some threshold value (e.g. less than 1%).

In some embodiments, the non-uniform brightness distribution of the display panel 315 and the error distribution of the optics block 230 together result in image light at the eyebox 215 with a lower brightness in a peripheral region than in a center region that is circumscribed by the peripheral region, the extraction features of the waveguide have a corresponding spatial distribution. In this case, the peripheral region is further away from the optical axis 320 than the center region. To offset errors in brightness in the image light, the spatial distribution of extraction features includes a higher spatial density of extraction features in the peripheral region than in the center region. The increase in light out-coupled from the waveguide 310 at the peripheral region off-sets the decrease in image light at the peripheral regions due to the display block and the optics block 230, resulting in a target brightness distribution that is spatially uniform within a tolerance (e.g. less than 1% spatial variation in brightness).

While the exemplary embodiments discussed above feature a peripheral region and a center region, embodiments of the present disclosure are not limited to such configuration. Other embodiments may include different regions with different corresponding spatial densities of extraction features than what is discussed in the above example.

In some embodiments, the backlit display assembly 205, including the display block 225 and optics block 230, are configured to deliver light to a user in order to display image content to a user of the headset 100. The light source assembly 305 incouples light into the waveguide 310 through an incoupling area 325. The light travels through the waveguide 310 in a direction different from the optical axis 320. The extraction features 345 out-couple the light in a direction towards the display panel 315 along the optical axis 320. The display panel 315 spatially modulates the out-coupled light to form image light which is manipulated and directed towards the eyebox of a user by the optics block 230. The spatial distribution of the extraction features 345 offsets errors in the brightness distribution of image light directed towards the eyebox, which may be introduced by the display panel 315 and/or the optics block 230 (and/or potentially other components). Thus, reducing changes of poor user experiences with the headset 100 due to errors (e.g., un-intended non-uniformities) in the brightness distribution of image light.

Light Extraction

Figure 4:
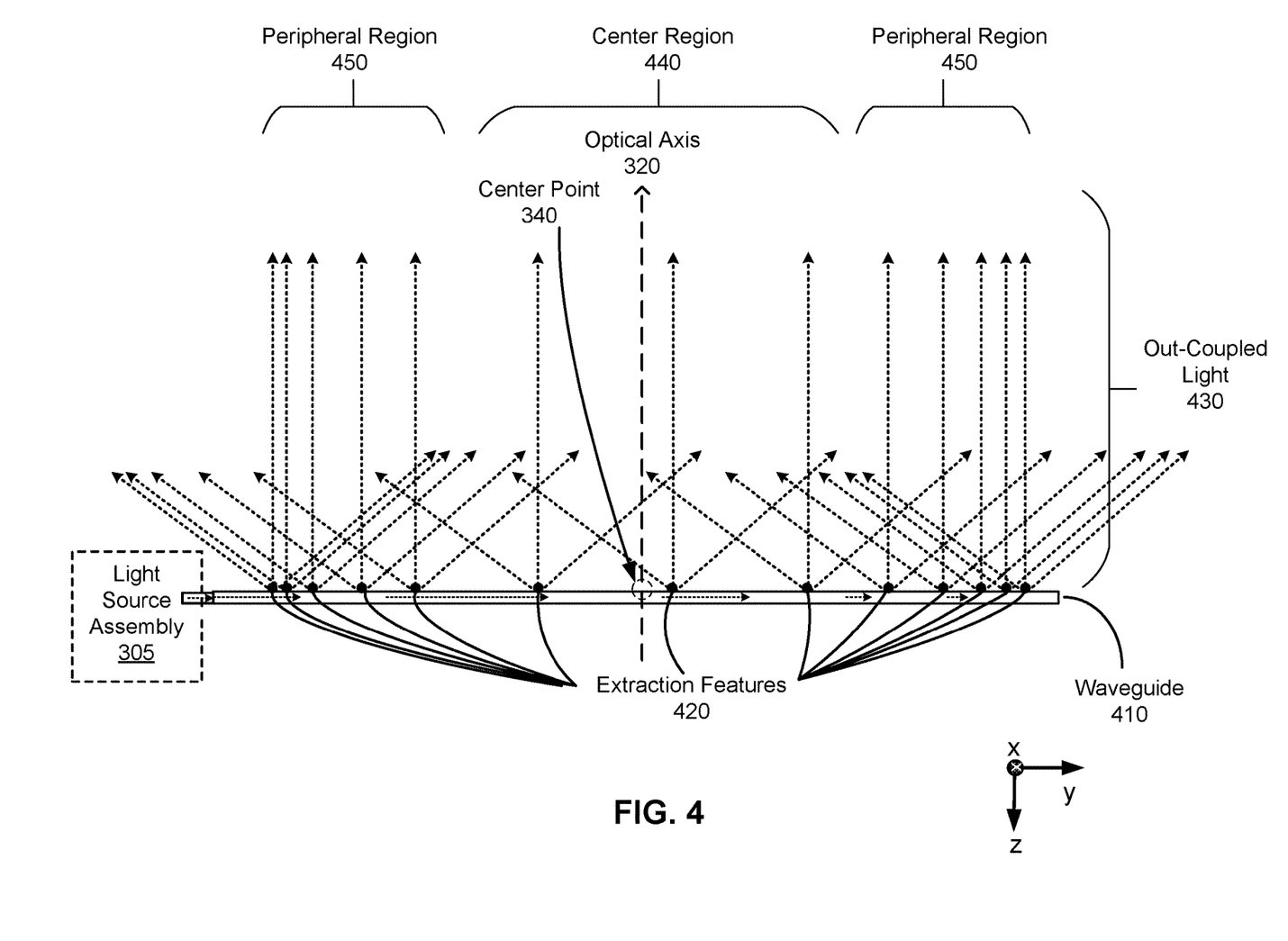
FIG. 4 is a cross-section of a waveguide with extraction features, in accordance with one or more embodiments.

FIG. 4 is a cross-section 400 of a waveguide 410 with extraction features 420, in accordance with one or more embodiments. The waveguide 410 is an embodiment of the waveguide 310. Light from the light source assembly 305 is incoupled into the waveguide 410, and the light travels internally in the waveguide along a direction that is different than the optical axis 320.

The waveguide 410 includes a plurality extraction features 420 that out-couple light from the waveguide 420 to form out-coupled light 430. For ease of illustration a portion of the plurality of extraction features 420 are illustrated in FIG. 4. Moreover, while the extraction features 420 illustrated in FIG. 4 occur along an axis that is substantially parallel to the y-axis for a fixed value of x, the plurality of extraction features on the waveguide 410 are more generally distributed across a plane that is substantially parallel to a plane formed by the x and y axis. The out-coupled light may be directed toward a display panel (e.g., the display panel 315) and/or some intermediate optical element prior to the display panel.

A spatial distribution of the extraction features 420 on a surface of the waveguide 410 introduces a first non-uniform brightness distribution to the out-coupled light 430 that is used to offset errors in brightness caused by components of a headset (e.g., components of the optics block 230, a display panel 315, another component, or some combination thereof). For example, a display panel may introduce errors in the brightness distribution of the image light provided to an optics block (e.g., the optics block 230). Likewise, the optics block may introduce errors in the brightness distribution of the image light directed towards an eyebox. These errors in the brightness distribution may generally be described as non-uniformities in the brightness distribution. The spatial distribution of the extraction features 420 is such that the first non-uniform brightness distribution of the out-coupled light 430 offsets the errors introduced into the brightness distribution of the image light by other components of the headset, thereby, resulting in a target brightness distribution of the image light at the eyebox. The target brightness distribution is a brightness distribution for providing image content to a user. In some embodiments, the target brightness distribution is a uniform brightness distribution.

As shown in FIG. 4, the spatial distribution of extraction features 460 includes a center region 440 and a peripheral region 450 that circumscribes the center region 450. A spatial density (extraction feature per unit area) of the extraction features 420 is higher in the peripheral region 450 than in the center region 440. The higher density of extraction features 420 in the peripheral region 450 results in an increased amount of out-coupled light in the peripheral region 450. Thus, the first non-uniform brightness distribution in the out-coupled light 430 is be spatially modulated such that the out-coupled light 430 in the peripheral region 450 is brighter than the out-coupled light 430 in the center region 440. In this case, the first non-uniform brightness distribution of the out-coupled light 430 offsets an error in brightness distribution (e.g., a dimming of light relative to other portions of the image light) at the peripheral region 450 introduced by other components of the headset 100, resulting in a target brightness distribution at the eyebox 215 that has significantly reduced spatial non-uniformities. Other embodiments may include other types of errors in brightness distribution introduced by components of the headset 100 other than a dimming at the peripheral region 450. In such cases, other spatial distributions of the extraction features 420 may correspond to the errors in brightness distribution.

In alternate embodiments, the extraction features 420 may have a lower spatial density in the peripheral region 450 than in the center region 440, and thus may have a lower brightness of out-coupled light 430 in the peripheral region 450 than in the center region 440. In some embodiments, the spatial density of the extraction features 420 in the peripheral region 450 increases as a function of distance from a center point 460. The center point 340 is an on-axis intersection point of the waveguide 410 and the optical axis 320. In some embodiments, a spatial distribution of the extraction features 420 are symmetric with respect to an axis parallel to the x-axis and/or an axis parallel to the y-axis, are rotationally symmetric about the optical axis 320, are rotationally symmetric about some axis parallel to the optical axis 320, or some combination thereof. In some embodiments, the spatial distribution of extraction features 420 is asymmetric with respect to an axis parallel to the x-axis and/or an axis parallel to the y-axis.

Additionally, embodiments of the present disclosure are not limited to configurations with a center region and a peripheral region, as illustrated in FIG. 4. In some embodiments, the spatial density of the extraction features 420 is not dependent on a region and increases as a function of distance from the center point 760. Although the spatial distribution is shown in FIG. 4 includes the center region 440 and the peripheral region 450, the spatial distribution may have more regions with various configurations of shape, size, and spatial density of extraction features 420 in each region. In other embodiments, the spatial distribution is configured with other variations of the spatial density of the extraction features 460.

The waveguide 410 may provide out-coupled light 430 towards a display panel and optics block. The spatial distribution of the extraction features 420 may provide a first non-uniform brightness distribution in the out-coupled light 430 that offsets errors in the brightness of light delivered to an eyebox introduced by the optics block, the display block, other components of the headset 100, or some combination thereof, resulting in a target brightness distribution. The target brightness distribution may correspond to an optimal viewing experience of image content for a user, free of errors in the brightness of light delivered to the eyebox.

Figure 5:
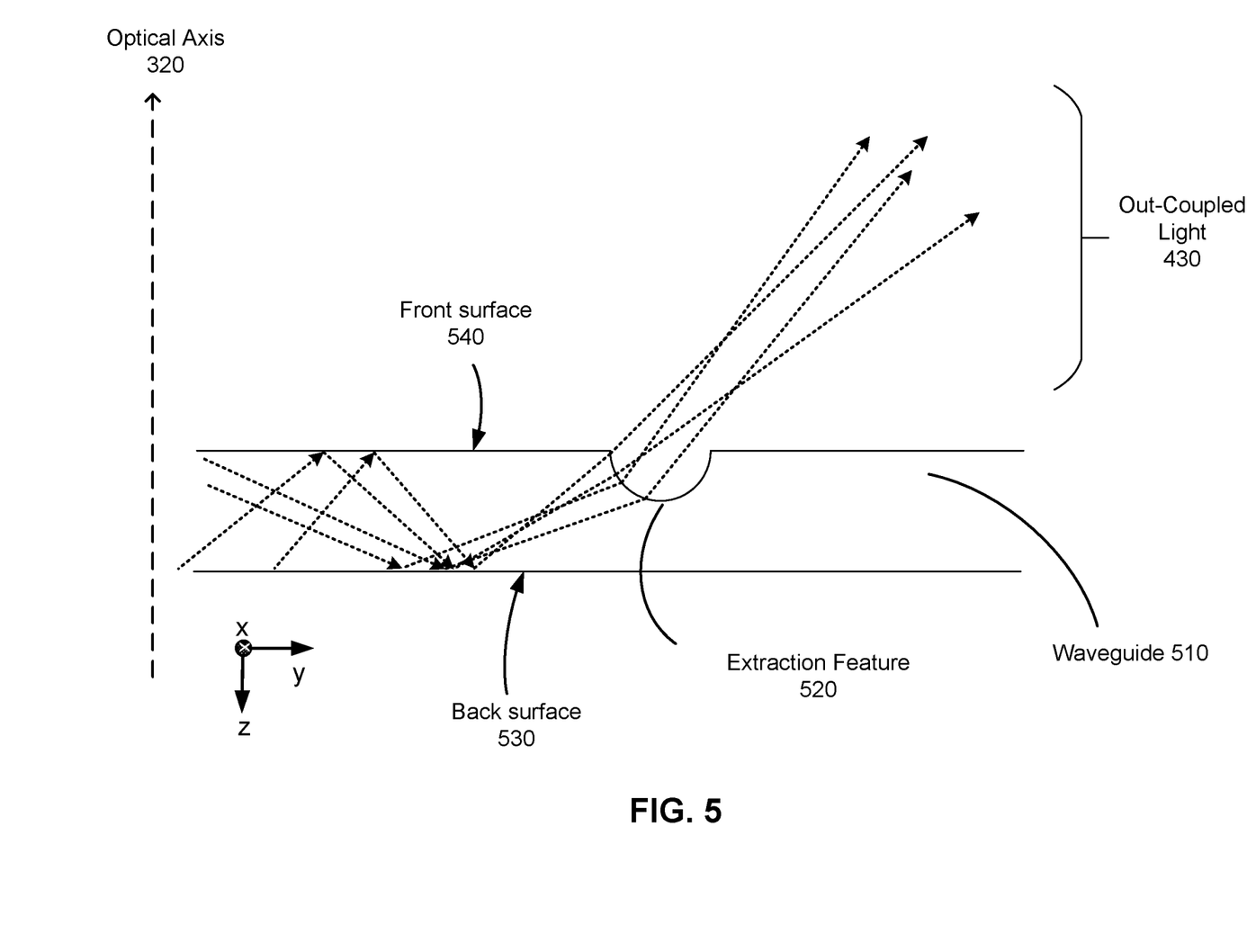
FIG. 5 is a cross-section of an extraction feature on a waveguide, in accordance with one or more embodiments.

FIG. 5 is a cross-section of an extraction feature on a waveguide 510, in accordance with one or more embodiments. The waveguide 510 is an embodiment of the waveguide 410 shown in FIG. 4. As shown in FIG. 5, light propagates in the waveguide 510 by internal reflection (e.g., TIR) along a direction that is different than the optical axis 320, and is out-coupled from the waveguide 510 by an extraction feature 520. The extraction feature 520 is an embodiment of one of the extraction features 420 shown in FIG. 4. The extraction feature 520 may have one of several forms, for example a concave micro-dome structure, as shown in FIG. 5. Other embodiments include an extraction feature that are, e.g., a pyramid structure, a convex micro-dome structure, a protruding dot structure, a polyhedral structure, a prism structure, some other structure that cause light to out-couple from the waveguide, or some combination thereof. The extraction feature 520 may have a size ranging from a few nanometers in width to a few millimeters in width. The size of the extraction feature 520 may correspond to a wavelength light in the first optical band. The extraction feature 520 may be formed of the same material as the waveguide 510 and may be optically transparent, but may also be formed of a different material from the waveguide and may have an opacity different than the waveguide 510.

Light incident at the extraction feature 520 is not internally reflected, due to an incidence angle lower than a critical angle of the waveguide 520, and as a result out-couples through a surface of the waveguide 510 that the extraction feature 520 is provided on. Likewise, in embodiments where an extraction feature is located on a back surface 530 of the waveguide 510, the extraction feature bends the light such that its next incidence on a front surface 540 is less than the critical angle, thereby, causing the light to out-couple from the waveguide 510.

Out-coupled light 430 from the waveguide 520 may then travels, e.g., towards and through a display panel along the optical axis 320, as illustrated in FIG. 3. In some embodiments, the optical axis 320 is perpendicular to the direction of the light source assembly; however, embodiments of the present disclosure are not limited to this arrangement. In some embodiments the waveguide 510 has a curvature and is not flat as shown in FIG. 5.

Spatial Distribution of Extraction Features

Figure 6:
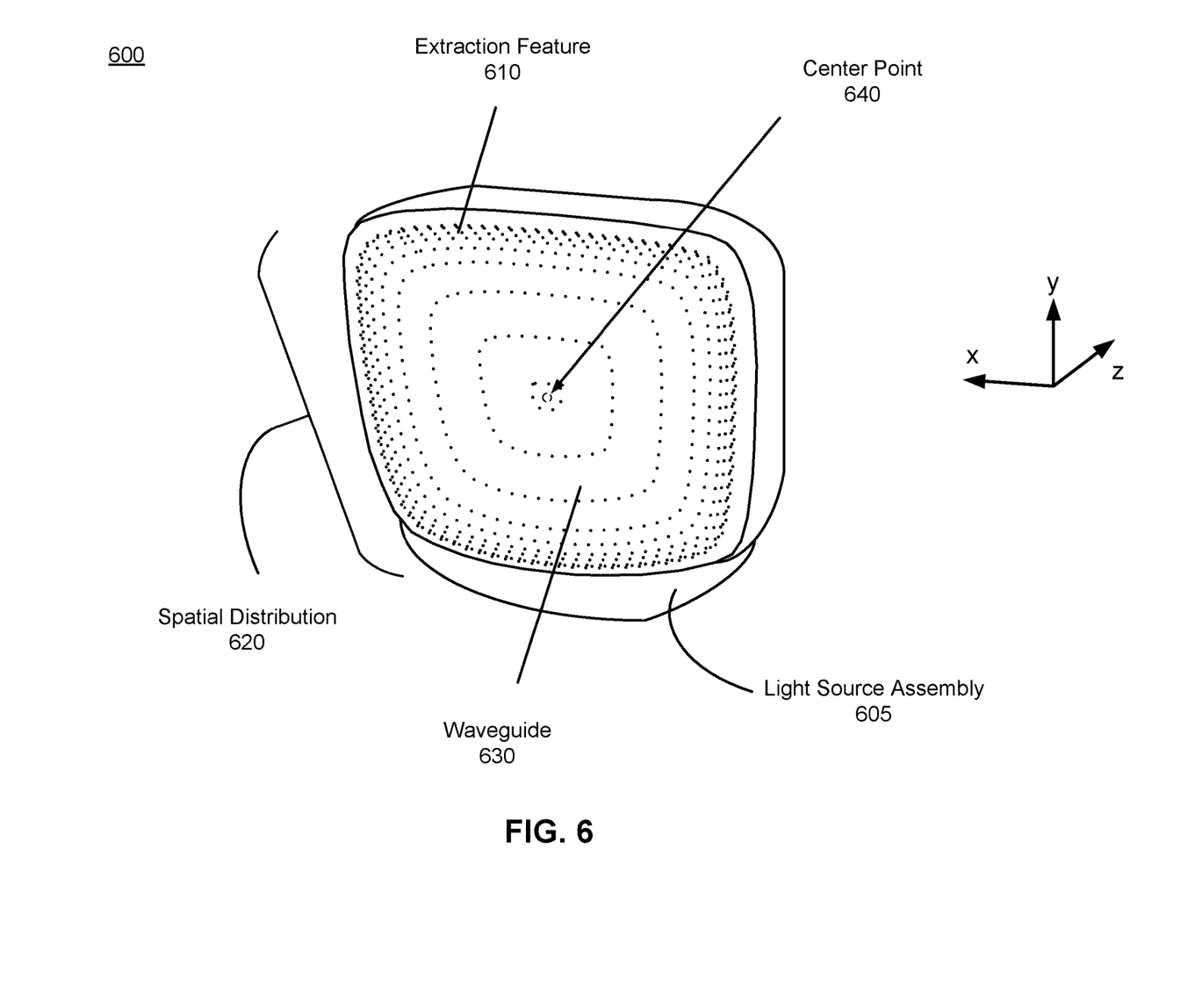
FIG. 6 is a diagram of a display block with a plurality of extraction features arranged in a spatial distribution on a front surface of a waveguide, in accordance with one or more embodiments.

FIG. 6 is a diagram of a display block 600 with a plurality of extraction features 610 arranged in a spatial distribution 620 on a front surface of a waveguide 630, in accordance with one or more embodiments. The display block 600 is an embodiment of the display block 225. Light from a light source assembly 605 is incoupled to the waveguide 630 through an incoupling area (not shown) and travels through the waveguide 630 via total internal reflection. The light source assembly 605 is an embodiment of the light-source assembly 305. The incoupled light from the light source assembly 605 is incident in a direction along the y-axis. The extraction features then out-couple the light, directing it in a direction along an optical axis (not shown) which is coming out of the page parallel to the z-axis. The optical axis intersects the front surface of the waveguide 630 at a center point 640.

The spatial distribution 620 of extraction features introduces a first non-uniform brightness distribution to the out-coupled light which may offset errors in a brightness distribution caused by other components of the headset 100. As shown in FIG. 6, the spatial distribution 620 features a higher spatial density of extraction features 610 as a function of distance from the center point 640. In this case, the spatial density of extraction features 610 is higher at a periphery of the waveguide 630 than near the center point 640, resulting in a first non-uniform brightness distribution with a higher brightness of out-coupled light at the periphery than at the center. The first non-uniform brightness distribution may offset a dimming of the image light at a periphery introduced by other components of a headset 100, thereby, resulting in a target brightness distribution. In some embodiments, the target brightness distribution is a spatially uniform distribution within a tolerance. The tolerance, for example may be 1% or less spatial variations in brightness.

In some embodiments, the headset 100 includes two display blocks 600 for providing image light to each eye of a user. In other embodiments, the headset 100 may include a single display block for providing image light to both eyes of a user. In some embodiments, the display block may not deliver light to an eye of a user, but to some other object or surface. For example, display block may be part of a projection system that projects image light onto a wall. And the spatial distribution of extraction features are used to offset errors in the brightness profile caused by other components of the projection system.

As illustrated in FIG. 6, the spatial density of extraction features 610 increases in both the y-dimension and the x-dimension, as a function of distance from the center point 640. In other embodiments, the spatial distribution 620 may have other configurations. For example, the spatial density of extraction features 610 may vary in one of either the x-dimension or the y-dimension, but not the other. In some embodiments, the spatial distribution 620 may be symmetric in respect to an axis parallel to the x-axis, symmetric in respect to an axis in respect to the y-axis, or rotationally symmetric in respect to the optical axis (not shown) parallel to the z-axis and intersecting the center point 640. Other embodiments may include a spatial distribution 620 that varies with an angle from a reference direction, for example with an angle relative to the y-axis. In other embodiments, the light source assembly 605 may be positioned differently than shown in FIG. 6 with an incoupling area having a different orientation. For example, the light source assembly 605 may be positioned on a left side of the waveguide 630, and the incoupling area may be a left face of the waveguide 630. In this case, incident light from the light source assembly 605 is directed in a direction along the x-axis.

In some embodiments, the waveguide 630 is curved. A front surface or a back surface of the waveguide 630 may not be flat with respect to the z-axis.

The display block 600 may provide image light to other components of the headset 100 which manipulate and/or direct the image light. The spatial distribution 620 of extraction features 610 provide a first non-uniform brightness distribution which may offset errors in brightness introduced by the other components of the headset 100. The use of the spatial distribution 620 of extraction features 610 allows a freedom of design for the headset 100, where errors in the brightness distribution introduced by the other components of the headset 100 do not limit or degrade the image quality of the headset 100.

System Environment

Figure 7:
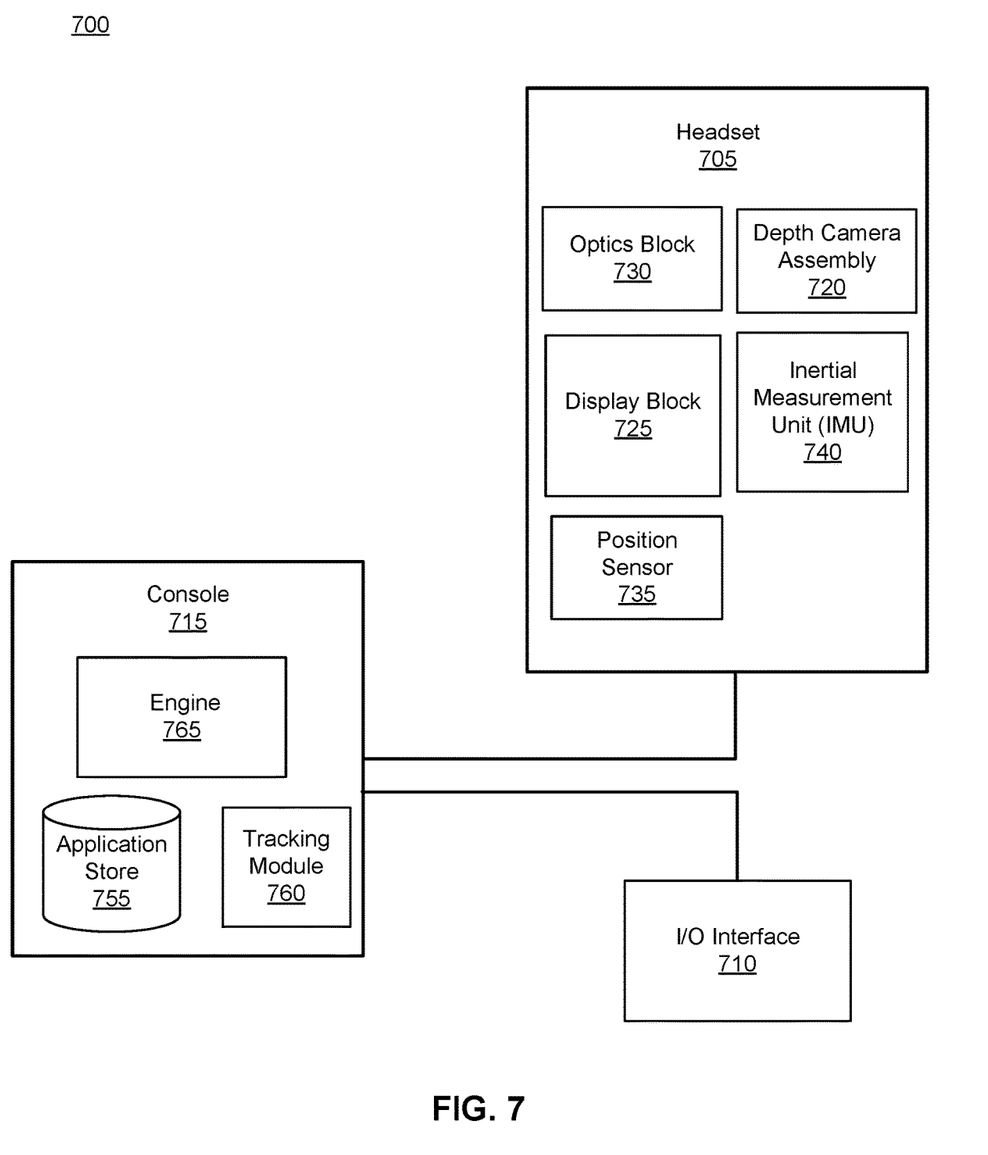
FIG. 7 is a block diagram of an artificial reality system, in accordance with one or more embodiments.

FIG. 7 is a block diagram of an artificial reality system 700, in accordance with one or more embodiments. The artificial reality system 700 may operate in an artificial reality system environment. In some embodiments, the artificial reality system 700 shown by FIG. 7 comprises a headset 705 and an input/output (I/O) interface 710 that is coupled to the console 715. While FIG. 7 shows an example artificial reality system 700 including one headset 705 and one I/O interface 710, in other embodiments any number of these components may be included in the artificial reality system 700. For example, there may be multiple headsets 705 each having an associated I/O interface 710, with each headset 705 and I/O interface 710 communicating with the console 715. In alternative configurations, different and/or additional components may be included in the artificial reality system 700. Additionally, functionality described in conjunction with one or more of the components shown in FIG. 7 may be distributed among the components in a different manner than described in conjunction with FIG. 7 in some embodiments. For example, some or all of the functionality of the console 715 is provided by the headset 705.

The headset 705 presents content to a user comprising virtual and/or augmented views of a physical, real-world environment with computer-generated elements (e.g., two-dimensional (2D) or three-dimensional (3D) images, 2D or 3D video, sound, etc.). The headset 705 may be, e.g., a HMD or a NED that includes a display block (e.g., the display block 225). In some embodiments, the presented content includes audio that is presented via an external device (e.g., speakers and/or headphones) that receives audio information from the headset 705, the console 715, or both, and presents audio data based on the audio information. The headset 705 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the headset 705 is the headset 100 described above in conjunction with FIG. 1.

The headset 705 includes a DCA 720, a display block 725, an optics block 730, one or more position sensors 735, and an IMU 740. Some embodiments of the headset 705 have different components than those described in conjunction with FIG. 7. Additionally, the functionality provided by various components described in conjunction with FIG. 7 may be differently distributed among the components of the headset 705 in other embodiments.

The DCA 720 captures data describing depth information of an area surrounding some or all of the headset 705. The DCA 720 can compute the depth information using the data (e.g., based on captured portions of structured light), or the DCA 720 can send this information to another device such as the console 715 that can determine the depth information using the data from the DCA 720.

The DCA 720 includes a light generator, an imaging device, and a controller that may be coupled to both the light generator and the imaging device. The light generator of the DCA 720 is configured to illuminate a local area with structured light in accordance with emission instructions from the controller. The structure light may be in an infrared band. The imaging device of the DCA 720 is configured to capture one or more images of portions of the structured light reflected from one or more objects in the local area. The controller of the DCA 720 generates the emission instructions and provides the emission instructions to the light generator of the DCA 720. The controller of the DCA 720 is also configured to determine depth information for the one or more objects based at least in part on the captured one or more images of portions of the reflected structured light.

The display block 725 displays 2D or 3D images to the user in accordance with data received from the console 715. In various embodiments, the display block 725 comprises a single electronic display or multiple electronic displays (e.g., a display for each eye of a user). In some embodiments, the display block includes a light source assembly, a waveguide, and a display panel. The light source assembly provides light that is coupled into the waveguide which directs the light towards an eyebox of the user through the display panel along an optical axis. Extraction features arranged on one or more surfaces of the waveguide with a spatial distribution out-couple light received from the light source assembly towards the display panel. The display panel spatially modulates the out-coupled light from the waveguide according to data to form image light to be displayed to the user. For example, the display panel may be a liquid crystal display panel, some other display that spatially modulates light to form image light, or some combination thereof. The image light from the display panel is directed to the optics block 730. The spatial distribution of extraction features may offset errors in brightness of the image light that reaches the eyebox caused by other components of the headset 705. The display block 725 may be an embodiment of the display block 225 in FIGS. 2 and 3.

The optics block 730 magnifies image light received from the display block 725, corrects optical errors associated with the image light, and presents the corrected image light to a user of the headset 705. The optics block 730 includes a plurality of optical elements (e.g., that form a pancake lens assembly). Example optical elements included in the optics block 730 include: an aperture, a Fresnel lens, a convex lens, a concave lens, a filter, a reflecting surface, or any other suitable optical element that affects image light. Moreover, the optics block 730 may include combinations of different optical elements. In some embodiments, one or more of the optical elements in the optics block 730 may have one or more coatings, such as partially reflective or anti-reflective coatings.

Magnification and focusing of the image light by the optics block 730 allows the display block 725 to be physically smaller, weigh less and consume less power than larger displays. Additionally, magnification may increase the field-of-view of the content presented by the display block 725. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optics block 730 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations, errors due to the lens field curvature, astigmatisms, any other type of optical error, or some combination thereof. In some embodiments, content provided to the display block 725 for display is pre-distorted, and the optics block 730 corrects the distortion when it receives image light from the display block 725 generated based on the content. The optics block 730 may be an embodiment of the optics block 230 in FIGS. 2 and 3.

The IMU 740 is an electronic device that generates data indicating a position of the headset 705 based on measurement signals received from one or more of the position sensors 735 and from depth information received from the DCA 720. A position sensor 735 generates one or more measurement signals in response to motion of the headset 705. Examples of position sensors 735 include: one or more accelerometers, one or more gyroscopes, one or more magnetometers, another suitable type of sensor that detects motion, a type of sensor used for error correction of the IMU 740, or some combination thereof. The position sensors 735 may be located external to the IMU 740, internal to the IMU 740, or some combination thereof.

Based on the one or more measurement signals from one or more position sensors 735, the IMU 740 generates data indicating an estimated current position of the headset 705 relative to an initial position of the headset 705. For example, the position sensors 735 include multiple accelerometers to measure translational motion (forward/back, up/down, left/right) and multiple gyroscopes to measure rotational motion (e.g., pitch, yaw, roll). In some embodiments, the IMU 740 rapidly samples the measurement signals and calculates the estimated current position of the headset 705 from the sampled data. For example, the IMU 740 integrates the measurement signals received from the accelerometers over time to estimate a velocity vector and integrates the velocity vector over time to determine an estimated current position of a reference point on the headset 705. Alternatively, the IMU 740 provides the sampled measurement signals to the console 715, which interprets the data to reduce error. The reference point is a point that may be used to describe the position of the headset 705. The reference point may generally be defined as a point in space or a position related to the HMD's 705 orientation and position.

The IMU 740 receives one or more parameters from the console 715. The one or more parameters are used to maintain tracking of the headset 705. Based on a received parameter, the IMU 740 may adjust one or more IMU parameters (e.g., sample rate). In some embodiments, certain parameters cause the IMU 740 to update an initial position of the reference point so it corresponds to a next position of the reference point. Updating the initial position of the reference point as the next calibrated position of the reference point helps reduce accumulated error associated with the current position estimated the IMU 740. The accumulated error, also referred to as drift error, causes the estimated position of the reference point to "drift" away from the actual position of the reference point over time. In some embodiments of the headset 705, the IMU 740 may be a dedicated hardware component. In other embodiments, the IMU 740 may be a software component implemented in one or more processors.

The I/O interface 710 is a device that allows a user to send action requests and receive responses from the console 715. An action request is a request to perform a particular action. For example, an action request may be an instruction to start or end capture of image or video data or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU 740 that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 720, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 calibrates the artificial reality system 700 using one or more calibration parameters and may adjust one or more calibration parameters to reduce error in determination of the position of the headset 705 or of the I/O interface 710. For example, the tracking module 760 communicates a calibration parameter to the DCA 720 to adjust the focus of the DCA 720 to more accurately determine positions of structured light elements captured by the DCA 720. Calibration performed by the tracking module 760 also accounts for information received from the IMU 740 in the headset 705 and/or an IMU 740 included in the I/O interface 710. Additionally, if tracking of the headset 705 is lost (e.g., the DCA 720 loses line of sight of at least a threshold number of structured light elements), the tracking module 760 may re-calibrate some or all of the artificial reality system 700.

The tracking module 760 tracks movements of the headset 705 or of the I/O interface 710 using information from the DCA 720, the one or more position sensors 735, the IMU 740 or some combination thereof. For example, the tracking module 760 determines a position of a reference point of the headset 705 in a mapping of a local area based on information from the headset 705. The tracking module 760 may also determine positions of the reference point of the headset 705 or a reference point of the I/O interface 710 using data indicating a position of the headset 705 from the IMU 740 or using data indicating a position of the I/O interface 710 from an IMU 740 included in the I/O interface 710, respectively. Additionally, in some embodiments, the tracking module 760 may use portions of data indicating a position or the headset 705 from the IMU 740 as well as representations of the local area from the DCA 720 to predict a future location of the headset 705. The tracking module 760 provides the estimated or predicted future position of the headset 705 or the I/O interface 710 to the engine 765.

The engine 765 generates a 3D mapping of the area surrounding some or all of the headset 705 (i.e., the "local area") based on information received from the headset 705. In some embodiments, the engine 765 determines depth information for the 3D mapping of the local area based on information received from the DCA 720 that is relevant for techniques used in computing depth. The engine 765 may calculate depth information using one or more techniques in computing depth from one or more polarized structured light patterns. In various embodiments, the engine 765 uses the depth information to, e.g., update a model of the local area, and generate content based in part on the updated model.

The engine 765 also executes applications within the artificial reality system 700 and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual environment or in an environment augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A headset comprising:
   a display block including:
     a waveguide configured to receive light from a light source assembly,
     a plurality of extraction features that have a spatial distribution across one or more surfaces of the waveguide, wherein the plurality of extraction features out-couple light from the waveguide, and the spatial distribution is such that out-coupled light has a first non-uniform brightness distribution, and
     a display panel configured to modulate the out-coupled light to form image light, wherein the image light has a brightness distribution based in part on the first non-uniform brightness distribution; and
   an optics block including one or more optical elements configured to direct the image light to an eyebox, and the optics block adds a second non-uniform brightness distribution that is offset by the first non-uniform brightness distribution, such that the image light directed to the eyebox has a target brightness distribution.

2. The headset of claim 1, wherein the brightness distribution of the image light output from the display panel includes an error brightness distribution, and the first non-uniform brightness distribution offsets the error brightness distribution.

3. The headset of claim 1, wherein the extraction features are selected from a group consisting of: half-dome structures, prism structures protruding, dots, some other structures that cause light to out-couple from the waveguide, and some combination thereof.

4. The headset of claim 1, wherein the one or more surfaces of the waveguide include a first surface and a second surface that is opposite to the first surface, the first surface is closer to the eyebox than the second surface, and the spatial distribution of the plurality of extraction features is across the first surface.

5. The headset of claim 1, wherein the one or more surfaces of the waveguide include a first surface and a second surface that is opposite to the first surface, the first surface is closer to the eyebox than the second surface, and the spatial distribution of the plurality of extraction features is across the second surface.

6. The headset of claim 1, wherein the one or more surfaces of the waveguide include a first surface and a second surface that is opposite to the first surface, the first surface is closer to the eyebox than the second surface, and the spatial distribution of the plurality of extraction features is across the second surface and the first surface.

7. The headset of claim 1, wherein the spatial distribution of extraction features has a center region and a peripheral region that circumscribes the center region, and wherein a spatial density of the extraction features is higher in the peripheral region than in the center region.

8. The headset of claim 7, wherein the spatial density of the extraction features in the peripheral region increases as a function of distance from an on-axis intersection point of the waveguide and an optical axis of the display block.

9. The headset of claim 1, wherein the spatial distribution of extraction features is such that a spatial density of extraction features increases as a function of distance from an on-axis intersection point of the waveguide and an optical axis of the display block.

10. The headset of claim 1, wherein the target brightness distribution is a uniform distribution.

11. The headset of claim 1, wherein the one or more optical elements includes a first optical element and a second optical element that form a pancake lens assembly.

12. The headset of claim 1, wherein the headset is a head-mounted display.

13. A display block comprising:
   a light source assembly;
   a waveguide configured to receive light from the light source assembly;
   a plurality of extraction features that have a spatial distribution across one or more surfaces of the waveguide, wherein the plurality of extraction features out-couple light from the waveguide, and the spatial distribution is such that out-coupled light has a first non-uniform brightness distribution; and
   a display panel configured to modulate the out-coupled light to form image light, wherein the image light has a brightness distribution based in part on the first non-uniform brightness distribution, wherein an optics block including a first optical element and a second optical element that together generate a folded optical system that is configured to direct the image light to an eyebox, and the folded optical system adds a second non-uniform brightness distribution that is offset by the first non-uniform brightness distribution, such that the image light directed to the eyebox has a target brightness distribution.

14. The display block of claim 13, wherein the brightness distribution of the image light output from the display panel includes an error brightness distribution, and the first non-uniform brightness distribution offsets the error brightness distribution.

15. The display block of claim 13, wherein the one or more surfaces of the waveguide include a first surface and a second surface that is opposite to the first surface, the first surface is closer to the eyebox than the second surface, and the spatial distribution of the plurality of extraction features is across the first surface.

16. The display block of claim 13, wherein the one or more surfaces of the waveguide include a first surface and a second surface that is opposite to the first surface, the first surface is closer to the eyebox than the second surface, and the spatial distribution of the plurality of extraction features is across the second surface.

17. The display block of claim 13, wherein the one or more surfaces of the waveguide include a first surface and a second surface that is opposite to the first surface, the first surface is closer to the eyebox than the second surface, and the spatial distribution of the plurality of extraction features is across the second surface and the first surface.

18. The display block of claim 13, wherein the spatial distribution of extraction features has a center region and a peripheral region that circumscribes the center region, and wherein a spatial density of the extraction features is higher in the peripheral region than in the center region.

19. The display block of claim 13, wherein the spatial distribution of extraction features is such that a spatial density of extraction features increases as a function of distance from an on-axis intersection point of the waveguide and an optical axis of the display block.

20. The display block of claim 13, wherein the target brightness distribution is a uniform distribution.

* * * * *

UNITED STATES PATENT AND TRADEMARK OFFICE
CERTIFICATE OF CORRECTION

PATENT NO. : 10,809,446 B2
APPLICATION NO. : 16/231116
DATED : October 20, 2020
INVENTOR(S) : Chen et al.

Page 1 of 1

It is certified that error appears in the above-identified patent and that said Letters Patent is hereby corrected as shown below:

In the Claims

In Column 17, in Claim 1, Line 59, after "such that" insert -- the --.

In Column 18, in Claim 13, Line 62, after "such that" insert -- the --.

Signed and Sealed this
Sixth Day of April, 2021

Drew Hirshfeld
*Performing the Functions and Duties of the
Under Secretary of Commerce for Intellectual Property and
Director of the United States Patent and Trademark Office*